(12) United States Patent
Deng et al.

(10) Patent No.: US 10,826,377 B2
(45) Date of Patent: Nov. 3, 2020

(54) POWER CONVERTER, CONTROL CIRCUIT AND CONTROL METHOD FOR THE SAME

(71) Applicant: SILERGY SEMICONDUCTOR TECHNOLOGY (HANGZHOU) LTD, Zhejiang (CN)

(72) Inventors: Jian Deng, Zhejiang (CN); Jin Jin, Zhejiang (CN)

(73) Assignee: SILERGY SEMICONDUCTOR TECHNOLOGY (HANGZHOU) LTD, Zhejiang (CN)

(*) Notice: Subject to any disclaimer, the term of this patent is extended or adjusted under 35 U.S.C. 154(b) by 0 days.

(21) Appl. No.: 16/441,877

(22) Filed: Jun. 14, 2019

(65) Prior Publication Data

US 2019/0393770 A1 Dec. 26, 2019

(30) Foreign Application Priority Data

Jun. 22, 2018 (CN) .......................... 2018 1 0650867

(51) Int. Cl.
*H02M 1/088* (2006.01)
*H02M 3/335* (2006.01)

(52) U.S. Cl.
CPC ....... *H02M 1/088* (2013.01); *H02M 3/33569* (2013.01)

(58) Field of Classification Search
CPC ............ H02M 1/32; H02M 1/36; H02M 1/88; H02M 3/1563; H02M 3/33507; H02M 3/33523; H02M 3/33569; H02M 3/33576; H02M 3/33592; H02M 2001/0032; H02M 2007/4815; Y02B 70/126; Y02B 70/1441; Y02B 70/1443; Y02B 70/1475

(Continued)

(56) References Cited

U.S. PATENT DOCUMENTS

| 4,825,144 | A | * | 4/1989 | Alberkrack | ............. | H02M 3/28 |
| | | | | | | 323/272 |
| 6,069,471 | A | * | 5/2000 | Nguyen | ............... | G05B 13/021 |
| | | | | | | 323/271 |

(Continued)

FOREIGN PATENT DOCUMENTS

| CN | 101399500 A | 4/2009 |
| CN | 105375807 A | 3/2016 |
| CN | 107005163 A | 8/2017 |

OTHER PUBLICATIONS

First Chinese Office Action regarding Application No. 201810650867.X dated Jun. 5, 2019. English translation provided by Unitalen Attorneys at Law.

*Primary Examiner* — Yemane Mehari
(74) *Attorney, Agent, or Firm* — Harness, Dickey & Pierce, P.L.C.

(57) ABSTRACT

A power converter, a control circuit and a control method for the same. Ground references of a first controller and a second controller are different to isolate drive signals of a first transistor and a second transistor. Thus the first transistor and the second transistor are controlled to be switched between on and off alternatively to achieve power conversion. The circuit is simple in structure and easy to implement with a low cost. The ground reference of the first controller is an intermediate node of a bridge arm of the power converter, so as to facilitate sampling and acquiring a feedback signal, thereby achieving closed-loop control of the power converter.

16 Claims, 4 Drawing Sheets

(58) Field of Classification Search
USPC .......................................... 363/21.01–21.18
See application file for complete search history.

(56) References Cited

U.S. PATENT DOCUMENTS

| | | | |
|---|---|---|---|
| 6,621,256 B2 * | 9/2003 | Muratov | H02M 3/1563 |
| | | | 323/282 |
| 8,829,878 B2 * | 9/2014 | Noda | H02M 3/1588 |
| | | | 323/284 |
| 9,401,612 B2 | 7/2016 | Kinzer et al. | |
| 9,515,560 B1 * | 12/2016 | Telefus | H02M 3/158 |
| 9,529,373 B2 * | 12/2016 | Yuan | G05F 1/56 |
| 9,537,338 B2 | 1/2017 | Kinzer et al. | |
| 9,570,927 B2 | 2/2017 | Kinzer et al. | |
| 9,571,093 B2 | 2/2017 | Kinzer et al. | |
| 9,613,891 B2 | 4/2017 | Kinzer | |
| 9,640,471 B2 | 5/2017 | Kinzer | |
| 9,647,476 B2 | 5/2017 | Kinzer et al. | |
| 9,685,869 B1 | 6/2017 | Kinzer et al. | |
| 9,716,395 B2 | 7/2017 | Kinzer et al. | |
| 9,722,609 B2 | 8/2017 | Kinzer et al. | |
| 9,859,732 B2 | 1/2018 | Kinzer et al. | |
| 9,929,079 B2 | 3/2018 | Kinzer | |
| 9,960,620 B2 | 5/2018 | Kinzer et al. | |
| 9,960,764 B2 | 5/2018 | Kinzer et al. | |
| 10,110,124 B2 * | 10/2018 | Sun | H02M 3/156 |
| 10,135,275 B2 | 11/2018 | Kinzer et al. | |
| 10,170,922 B1 | 1/2019 | Kinzer et al. | |
| 10,269,687 B2 | 4/2019 | Kinzer | |
| 10,277,048 B2 | 4/2019 | Kinzer et al. | |
| 10,305,472 B1 | 5/2019 | Kinzer et al. | |
| 10,333,327 B2 | 6/2019 | Kinzer et al. | |
| 10,396,579 B2 | 8/2019 | Kinzer et al. | |
| 2009/0180304 A1 | 7/2009 | Bahramian et al. | |
| 2011/0133711 A1 * | 6/2011 | Murakami | H03K 17/0822 |
| | | | 323/282 |
| 2012/0091981 A1 * | 4/2012 | Komiya | H02M 3/156 |
| | | | 323/282 |
| 2015/0326123 A1 * | 11/2015 | Fukushima | H02M 3/158 |
| | | | 323/271 |
| 2016/0079785 A1 | 3/2016 | Kinzer et al. | |
| 2016/0079844 A1 | 3/2016 | Kinzer et al. | |
| 2016/0079853 A1 | 3/2016 | Kinzer et al. | |
| 2016/0079854 A1 | 3/2016 | Kinzer et al. | |
| 2016/0079964 A1 | 3/2016 | Kinzer et al. | |
| 2016/0079975 A1 | 3/2016 | Kinzer et al. | |
| 2016/0079978 A1 | 3/2016 | Kinzer et al. | |
| 2016/0079979 A1 | 3/2016 | Kinzer et al. | |
| 2016/0172961 A1 * | 6/2016 | Deng | H03K 17/6871 |
| | | | 327/109 |
| 2016/0247748 A1 | 8/2016 | Kinzer | |
| 2016/0247751 A1 | 8/2016 | Kinzer | |
| 2016/0336926 A1 | 11/2016 | Kinzer et al. | |
| 2017/0155391 A1 | 6/2017 | Kinzer et al. | |
| 2017/0162483 A1 | 6/2017 | Kinzer | |
| 2017/0163258 A1 | 6/2017 | Kinzer et al. | |
| 2017/0194237 A1 | 7/2017 | Kinzer | |
| 2017/0324263 A1 | 11/2017 | Kinzer et al. | |
| 2018/0102661 A1 | 4/2018 | Kinzer et al. | |
| 2019/0044357 A1 | 2/2019 | Kinzer et al. | |
| 2019/0148961 A1 | 5/2019 | Kinzer et al. | |
| 2019/0158086 A1 | 5/2019 | Kinzer et al. | |

* cited by examiner

POWER CONVERTER, CONTROL CIRCUIT AND CONTROL METHOD FOR THE SAME

The present application claims the priority to Chinese Patent Application No. 201810650867.X, titled "POWER CONVERTER, CONTROL CIRCUIT AND CONTROL METHOD FOR THE SAME", filed on Jun. 22, 2018 with the China National Intellectual Property Administration, which is incorporated herein by reference in their entireties.

FIELD

The present disclosure relates to power electronic technology, and in particular, to a power converter, a control circuit for the power converter and a control method for the power converter.

BACKGROUND

Shown in FIG. 1 is a conventional charge-pump half-bridge resonant power converter, which is mainly applied to high-power LED lighting. A primary side of the power converter is a half-bridge inverter circuit, and an alternating current source AC is rectified by a rectifying circuit 11 inputted into the half-bridge inverter circuit. A capacitor Cr' is a resonant capacitor. An inductor Lr' is a resonant inductor. The capacitor Cr' and the inductor Lr', in conjunction with a diode D1', a diode D2', a capacitor C1' and a capacitor C2', form a charge-pump power-factor-correction (PFC) circuit 12. A transistor Q1' and a transistor Q2' of the half-bridge inverter circuit are switched between on and off alternatively, to excite a high-frequency alternating signal. The high-frequency alternating signal is transmitted to a secondary side of the power converter through a transformer. On the secondary side, the high-frequency alternating signal powers an LED as a load, after being rectified by a rectifying circuit 14. Drive signals of the transistor Q1' and the transistor Q2' in the half-bridge inverter circuit should be isolated from each other.

In the conventional technology, as shown in FIG. 1, a feedback signal from a resonant current is sent into a control circuit 15 to generate a pulse width modulation (PWM) signal. The drive signals of the transistor Q1' and the transistor Q2' are isolated by passing the PWM signal through the drive transformer 13.

A cost of the circuit is greatly increased in the manner of isolating the drive signals of the transistor Q1' and the transistor Q2' via the drive transformer.

SUMMARY

In view of the above, a power converter, a circuit for controlling the power converter, and a method for controlling the power converter, are provided according to the present disclosure, so as to simplify the circuit and reduce the cost.

In a first aspect, a control circuit for a power converter is provided, where the power converter includes a bridge arm, the bridge arm includes a first transistor and a second transistor that are connected in series, and the control circuit includes:

a first controller, of which a ground reference is an intermediate node of the bridge arm of the power converter, configured to generate a first control signal and a second control signal based on a feedback signal, where the first control signal is configured to control the first transistor; and a second controller, configured to control the second transistor based on the second control signal.

Further, the first controller includes:

an error amplifier, configured to generate an error signal based on the feedback signal and a first reference signal;

a control-signal generation circuit, configured to generate the first control signal and the second control signal based on the error signal; and a first drive circuit, configured to generate a first drive signal based on the first control signal, to control the first transistor to be switched between on and off.

Further, the first controller includes:

a signal conversion circuit, configured to generate an intermediate signal based on the second control signal.

Further, the signal conversion circuit is configured to: set the intermediate signal to be a voltage at a voltage pull-up terminal in a case that the second control signal is not active, and set the intermediate signal to be a voltage at the intermediate node of the bridge arm of the power converter in a case that the second control signal is active.

Further, the signal conversion circuit includes:

a phase inverter, configured to invert a phase of the second control signal;

a first switch, where a first terminal of the first switch is connected to the voltage pull-up terminal, and a control terminal of the first switch receives the phase-inverted second control signal;

a second switch, where a first terminal of the second switch is connected to the intermediate node of the bridge arm of the power converter, and a control terminal of the second switch receives the second control signal; and where a second terminal of the first switch and a second terminal of the second switch are connected to a common terminal, and the common terminal serves as an output terminal of the signal conversion circuit and outputs the intermediate signal.

Further, the second controller includes:

a comparator, configured to generate a third control signal based on the intermediate signal and a second reference signal; and a second drive circuit, configured to generate a second drive signal based on the third control signal, to control the second transistor to be switched between on and off.

Further, a ground reference of the second controller is a grounding terminal of the power converter.

Further, the feedback signal is configured to characterize a resonant current of the power converter.

Further, the second reference signal is determined by the voltage at the voltage pull-up terminal and a forward threshold voltage of a body diode of the second transistor.

In a second aspect, a power converter is provided, including:

a bridge arm, including a first transistor and a second transistor that are connected in series;

a resonant circuit, including an inductance element and a capacitance element; and the aforementioned control circuit.

Further, the power converter includes a charge pump circuit, configured to perform power-factor-correction in conjunction with the resonant circuit.

In another aspect, a control method for a power converter is provided, where the power converter includes a bridge arm, the bridge arm includes a first transistor and a second transistor that are connected in series, and the control method includes:

generating a first control signal and a second control signal based on a feedback signal, where ground references of the first control signal and the second control signal are an intermediate node of the bridge arm of the power converter;

generating a first drive signal based on the first control signal, to control the first transistor; and generating a second drive signal based on the second control signal, to control the second transistor;

wherein ground references of the first drive signal and the second drive signal are different.

Further, generating the second drive signal based on the second control signal to control the second transistor includes:

generating an intermediate signal based on the second control signal;

generating a third control signal based on the intermediate signal; and generating the second drive signal based on the third control signal, to control the second transistor.

Further, the intermediate signal is equal to a voltage at a voltage pull-up terminal in a case that the second control signal is not active, and the intermediate signal is equal to a voltage at the intermediate node of the bridge arm of the power converter in a case that the second control signal is active.

According to technical solutions provided in embodiments of the present disclosure, the ground references of the first controller and the second controller are different, so as to isolate the drive signals of the first transistor and the second transistor from each other. Thereby, the first transistor and the second transistor are controlled to be switched between on and off alternatively, to realize power conversion. The circuit is simple in structure and easy to implement with a low cost. In addition, the ground reference of the first controller in the control circuit is set to be the intermediate node of the bridge arm of the power converter, so as to facilitate sampling and acquiring the feedback signal. Thereby, feedback control of the power converter is achieved.

BRIEF DESCRIPTION OF THE DRAWINGS

Hereinafter embodiments of the present disclosure is described in conjunction with drawings, to make the aforementioned and other objectives, characteristics and advantages of the present disclosure clearer. The drawings are as follows.

DETAILED DESCRIPTION OF EMBODIMENTS

Figure 1:
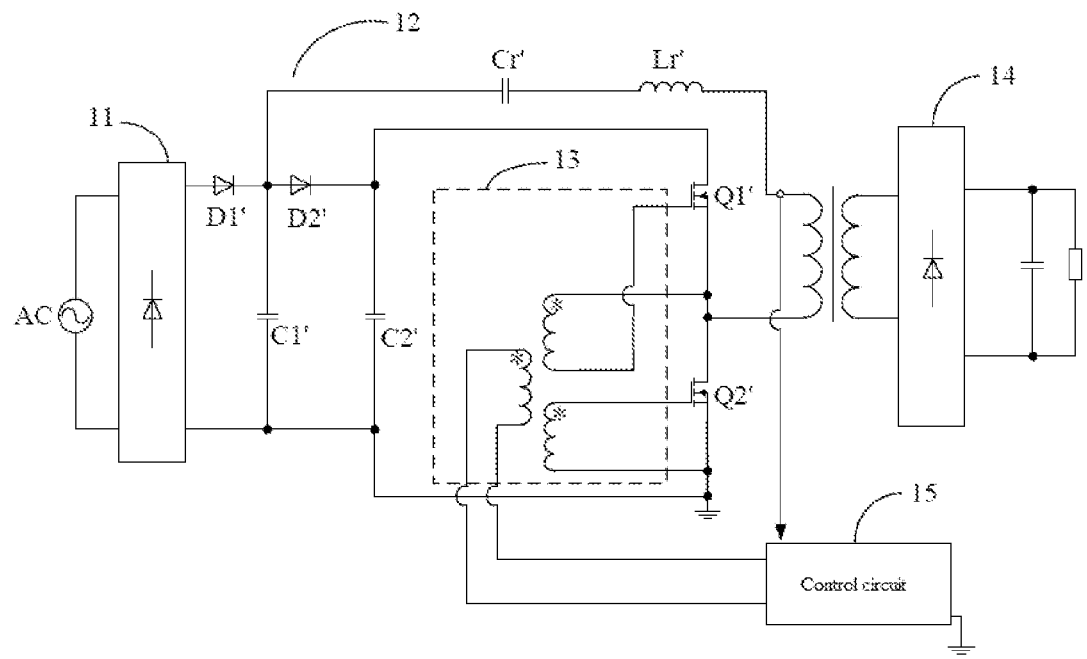
FIG. 1 is a circuit diagram of a power converter in conventional technology.

Embodiments of the present disclosure are described hereinafter. The present disclosure is not limited by the described embodiments. Hereinafter specific detailed parts are fully described in the description of the present disclosure. Those skilled in the art may thoroughly understand the present disclosure without such specific detailed parts. Methods, processes, elements and circuits that are well known by those skilled in the art are not fully described to prevent confusing substantial contents of the present disclosure.

In addition, those skilled in the art should appreciate that the provided drawings are for illustration, and dimensions shown in the drawings may not be drawn to scale.

In addition, it should be appreciated that the wording "circuit" in following description may refer to a conductive loop formed by at least one element or sub-circuit connected electrically or electromagnetically. In a case that an element or a circuit is referred to "connect" to another element or an element/circuit is referred to be "connected" between two nodes, it may be directly coupled or connected to another element, or there may be an intermediate element. Connections between elements may refer to a physical connection, a logical connection, or a combination of the physical connection and the logical connection. In a case that an element is referred to be "directly coupled" or "directly connected" with another element, it means that there is no intermediate element connected between them.

Unless defined otherwise in context, the terms "include", "comprise" or other similar terms in the whole specification and claims should be interpreted to be inclusive instead of being exclusive or exhaustive. Namely, they should be interpreted to be "including but not being limited to".

It should be appreciated in the description of the present disclosure that the terms "first" and "second" in the descriptions are merely for description, and should not be interpreted as indication or implication of relative importance. In addition, unless defined otherwise, the term "multiple" refers to a quantity of two or more than two in the description of the present disclosure.

Figure 2:
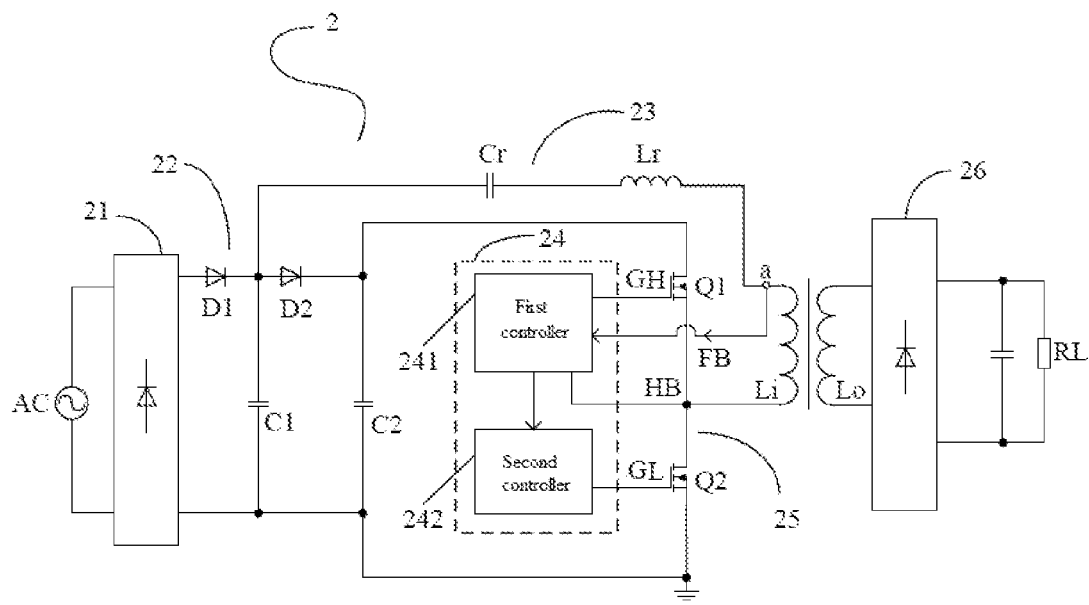
FIG. 2 is a circuit diagram of a power converter according to an embodiment of the present disclosure.
Figure 3:
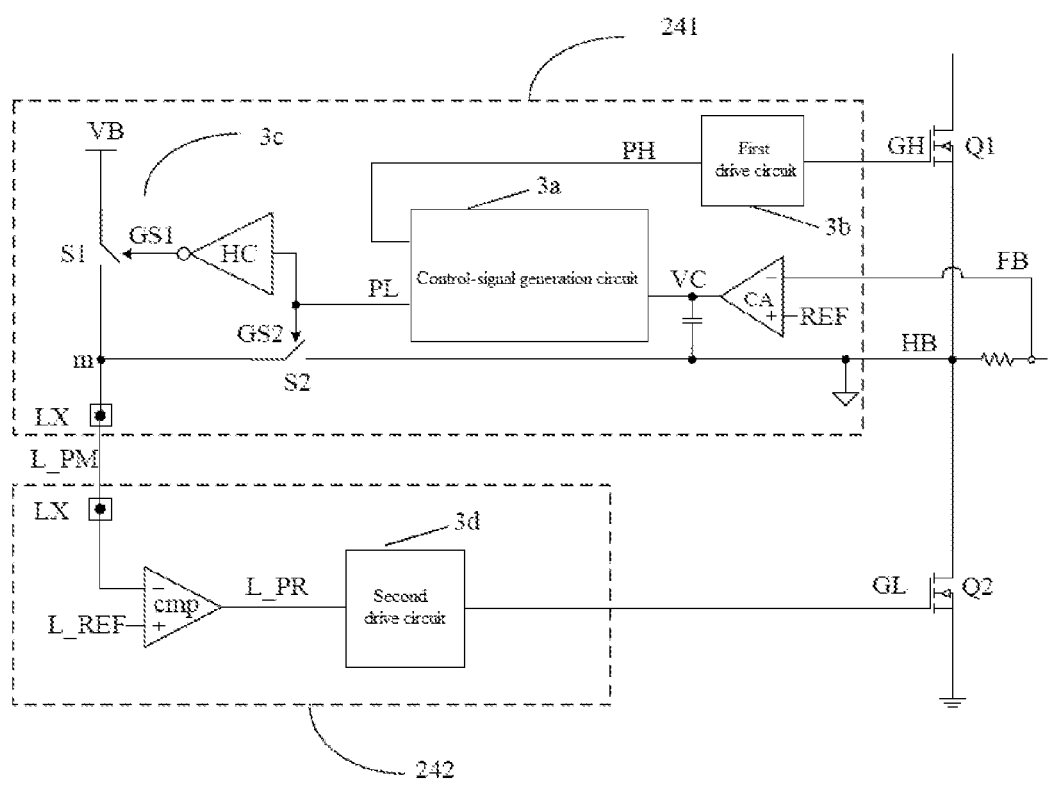
FIG. 3 is a circuit diagram of a control circuit according to an embodiment of the present disclosure.

FIG. 2 is a circuit diagram of a power converter according to an embodiment of the present disclosure. FIG. 3 is a circuit diagram of a control circuit according to an embodiment of the present disclosure. As shown in FIG. 2, a power converter 2 according to an embodiment of the present disclosure includes a rectifying circuit 21, a charge pump circuit 22, a resonant circuit 23, a control circuit 24, a bridge arm 25 and a rectifying circuit 26. The rectifying circuit 21 is connected between an alternating current source AC and the charge pump circuit 22, and is configured to convert an alternating current into a direct current, and output the direct current to the charge pump circuit 22. The rectifying circuit 26 receives an alternating current from a secondary side coil Lo, and converts the alternating current to a direct current to power a load. The bridge arm 25 is a half-bridge inverter circuit, and includes a transistor Q1 and a transistor Q2. It should be appreciated that the transistor Q1 and the transistor Q2 may be an electronically controlled switching element, such as a metal-oxide semiconductor field effect transistor (MOSFET), a bipolar junction transistor (BJT), and an insulated gate bipolar transistor (IGBT).

The charge pump circuit 22 is configured to receive the direct current outputted by the rectifying circuit 21 and perform DC-to-DC conversion, so as to achieve power factor correction in conjunction with the resonant circuit 23. The charge pump circuit 22 includes a diode D1, a diode D2, a capacitor C1 and a capacitor C2. An anode of the diode D1 is connected to an end of the rectifying circuit 21, and a cathode of the diode D1 is connected to an anode of the diode D2. A cathode of the diode D2 is connected to a drain of the transistor Q1. The capacitor C1 is connected between the anode of the diode D2 and another end of the rectifying circuit 21. The capacitor C2 is connected between the cathode of the diode D2 and the another end of the rectifying circuit 21. The resonant circuit 23 includes a capacitor Cr and an inductor Lr. The capacitor Cr and the inductor Lr are connected in series, and are connected between the anode of the diode D2 and an end "a" of a primary-side coil Li. It can be understood that a combination of the charge pump circuit 22 and the resonant circuit 23 is merely one implementation to achieve power factor correction, and other circuits capable to achieve the above function may also be applied to the embodiment.

The control circuit 24 includes a first controller 241 and a second controller 242. A ground reference of the first controller 241 is an intermediate node HB (that is, a common terminal of the transistor Q1 and transistor Q2) of the bridge arm 25, so as to facilitate sampling and acquiring a feedback signal FB. Thereby, feedback control is performed on the power converter. A ground reference of the second controller 242 is a grounding terminal of the power converter 2. The first controller 241 is configured to generate a first control signal and a second control signal based on the feedback signal FB. Preferably, the feedback signal FB characterizes a resonant current of the power converter 2. The first control signal is used to control the transistor Q1. The second controller 242 is configured to control the transistor Q2 based on the second control signal. In the embodiment, the ground references of the first controller 241 and the second controller 242 are different. Thus, drive signals of the transistor Q1 and the transistor Q2 are isolated from each other, so as to control both the transistor Q1 and transistor Q2 to be switched between on and off. It should be appreciated that the control circuit in the embodiment may be applied to a full-bridge inverter circuit.

As shown in FIG. 3, the first controller 241 includes an error amplifier CA, a control-signal generation circuit 3a and a first drive circuit 3b. The error amplifier CA is configured to generate an error signal VC based on the feedback signal FB and a first reference signal REF. The first reference signal REF characterizes an expected resonant current of the power converter 2. The control-signal generation circuit 3a is configured to generate a first control signal PH and a second control signal PL based on the error signal VC. The first drive circuit 3b is configured to generate a first drive signal GH based on the first control signal PH, to control the transistor Q1 to be switched between on and off. In the embodiment, the control-signal generation circuit 3a generates the first control signal PH and the second control signal PL in a manner of pulse-width modulation (PWM). It should be appreciated that other modulation methods such as pulse frequency modulation (PFM) may be applied to the embodiment of the present disclosure.

The first controller 241 further includes a signal conversion circuit 3c. The signal conversion circuit 3c is configured to generate an intermediate signal L_PM based on the second control signal PL. The intermediate signal L_PM is equal to a voltage VB at a voltage pull-up terminal in a case that the second control signal PL is not active. The intermediate signal L_PM is equal to a voltage at the intermediate node HB of the bridge arm of the power converter in a case that the second control signal is active.

Optionally, the signal conversion circuit 3c includes a phase inverter HC, a switch S1 and a switch S2. The phase inverter HC is configured to receive the second control signal PL, invert a phase of the second control signal, and output a control signal GS1, so as to control the switch S1 to be turned between on and off. A first terminal of the switch S1 is connected to the voltage pull-up terminal, and a control terminal of the switch S1 receives the control signal GS1. A first terminal of the switch S2 is connected to the intermediate node HB of the bridge arm of the power converter, and a control terminal of the switch S2 receives the second control signal PL (namely, a control signal GS2 for the switch S2). A second terminal of the switch S1 and a second terminal of the switch S2 are connected to a common terminal LX. The common terminal LX serves as an output terminal of the signal conversion circuit 3c, and outputs the intermediate signal L_PM to the second controller 242.

The second controller 242 includes a comparator cmp and a second drive circuit 3d. The comparator cmp is configured to generate a third control signal L_PR based on the intermediate signal L_PM and a second reference signal L_REF. The second reference signal L_REF is predetermined. In this embodiment, the second reference signal L_REF is determined by the voltage at the voltage pull-up terminal and a forward threshold voltage of a body diode of the transistor Q2. It should be understood that the voltage at the intermediate node HB is a ground reference for the voltage at the voltage pull-up terminal, and thus the voltage VB may be changed with reference to the voltage at the intermediate node HB. When the first transistor Q1 is turned on, the voltage at the intermediate node HB is equal to an input voltage of the power converter; and when the first transistor Q1 is turned off, the inductor current may flow through the body diode of the transistor Q2, the voltage at the intermediate node HB may be equal to −0.7V, in a case that the forward threshold voltage of the body diode of the transistor Q2 is 0.7V. Therefore, the value of the second reference signal L_REF may be between −0.7V and the voltage VB at the voltage pull-up terminal, with −0.7V as the ground reference of the first controller 241. The second drive circuit 3d is configured to generate a second drive signal GL based on the third control signal L_PR, to control the transistor Q2 to be switched between on and off.

The signal conversion circuit 3c and the second controller 242 share the common terminal LX. That is, the signal conversion circuit 3c and the controller 242 are connected via only one circuit branch. The information about the control signal for controlling the second transistor can be obtained via the signal conversion circuit. Thus, both the first transistor and the second transistor are controlled simultaneously, and thereby the circuit is simplified.

In the embodiment, due to the signal conversion circuit 3c of the power converter 2, the ground references of the first controller 241 and the second controller 242 are different. That is, the ground reference of the first controller 241 is the intermediate node HB of the bridge arm, and the ground reference of second controller 242 is the grounding terminal of the power converter. Thus, the drive signals of the transistor Q1 and the transistor Q2 are isolated from each other, so as to control the transistor Q1 and the transistor Q2 to be switched between on and off alternatively. The circuit is simple in structure and easy to implement with a low cost. In addition, the ground reference of the first controller 241 is set to be the intermediate node HB of the bridge arm in the power converter 2, so as to facilitate sampling and acquiring the feedback signal that characterizes the resonant current. Thereby, the feedback control of the power converter is achieved.

Those skilled in in the art should appreciate that the control circuit 24 in the embodiment is configured to isolate the drive signals of the transistor Q1 and the transistor Q2, in the half-bridge inverter circuit (i.e. the bridge arm), so as to control the transistor Q1 and the transistor Q2 to be switched between on and off alternatively and thereby achieve power conversion. Thus, the control circuit 24 may also be applied to other power converters that include a half-bridge inverter circuit, besides the charge-pump half-bridge resonant power converter.

Figure 4:
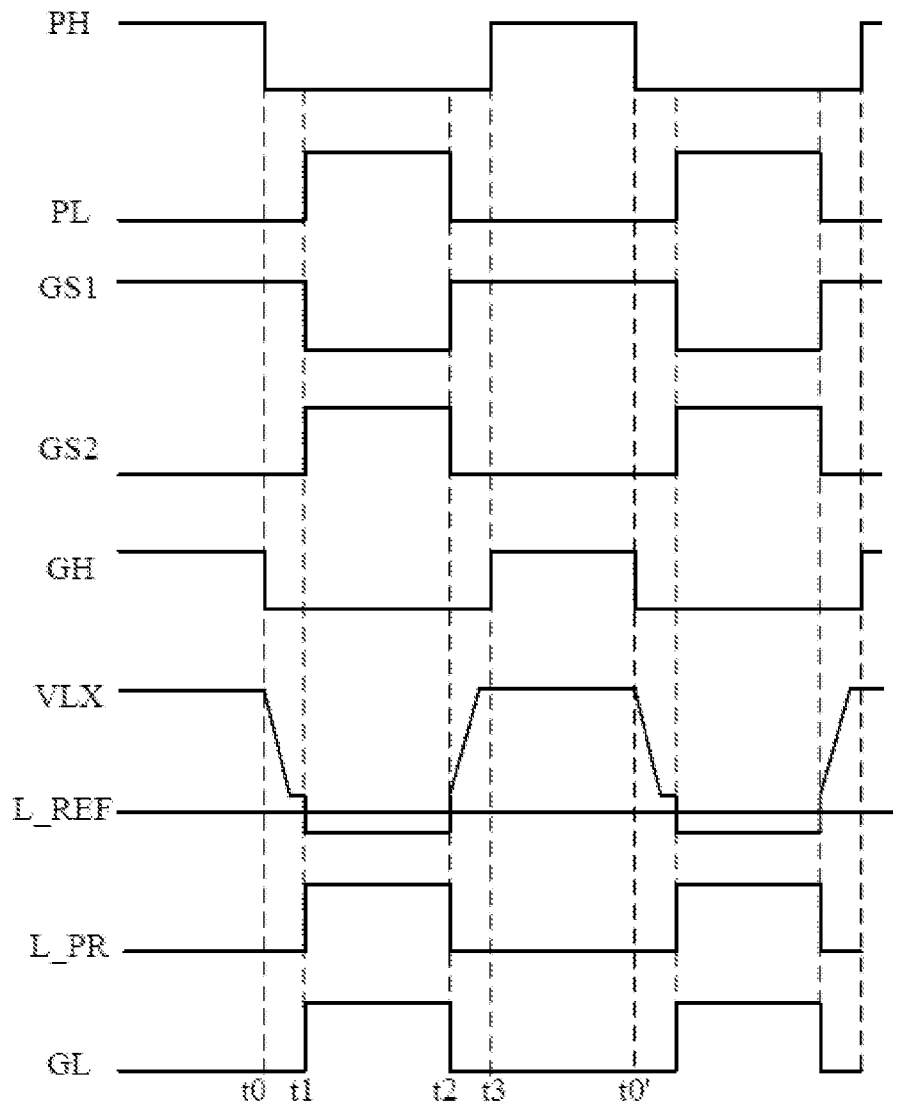
FIG. 4 is a waveform graph in operation of a control circuit according to an embodiment of the present disclosure.

FIG. 4 is a waveform graph in operation of a control circuit according to an embodiment of the present disclosure. As shown in FIG. 4, during a time period from t0 to t1, the first control signal PH is at a low level, the first drive signal GH is at a low level, and the transistor Q1 starts to be switched off. In such case, a body diode of the transistor Q2 is turned on due to a current of the inductor, and the voltage at the intermediate node HB of the bridge arm drops to −0.7V (assuming that the forward threshold voltage of the body diode is 0.7 V). At such time, the second control signal PL is also at a low level. Thus, the control signal GS1 of the switch S1 is at a high level and the control signal GS2 of the switch S2 is at a low level. That is, the switch S1 is on and the switch S2 is off. A voltage at the common terminal LX of the signal conversion circuit 3c and the second controller 242 is clamped by the voltage pull-up terminal, that is, the voltage VLX at the common terminal LX (i.e. the intermediate signal L_PM) equals to the voltage VB at the voltage pull-up terminal. In a time interval before time t0, transistor Q1 is turned on, and the voltage at the intermediate node HB is equal to the input voltage of the power converter. Now, the voltage at the intermediate node HB drops to −0.7V. Therefore, the voltage VB decreases with reference to the voltage at the intermediate node HB, since the intermediate node HB is the ground reference for the voltage VB. Since the voltage VB is greater than the second reference signal L_REF, the third control signal L_PR is at a low level, the second drive signal GL is at a low level, and the transistor Q2 is kept off.

During a time period from t1 to t2, the first control signal PH is at a low level. In such case, the first drive signal GH is at a low level, and the transistor Q1 is off. The second control signal PL is at a high level. Therefore, the control signal GS1 of the switch S1 is at a low level, and the control signal GS2 of the switch S2 is at a high level. That is, the switch S1 is off, and the switch S2 is on. Thus, the voltage VLX at the common terminal LX of the signal conversion circuit 3c and the second controller 242 equals to the voltage at the intermediate node HB of the bridge arm (i.e. −0.7V). In such case, the voltage VLX at the common terminal LX is smaller than the second reference signal L_REF. Therefore, the third control signal L_PR is at a high level, the second drive signal GL is at a high level, and the transistor Q2 starts to be turned on.

During a time period from t2 to t3, the first control signal PH is at a low level. In such case, the first drive signal GH is at a low level, and the transistor Q1 is kept off. The second control signal PL is also at a low level. Therefore, the control signal GS1 of the switch S1 is at a high level, and the control signal GS2 of the switch S2 is at a low level. That is, the switch S1 is on, and the switch S2 is off. The voltage at the common terminal LX of the signal conversion circuit 3c and the second controller 242 is clamped by the voltage pull-up terminal, that is, the voltage VLX at the common terminal LX (i.e. the intermediate signal L_PM) equals to the voltage VB at the voltage pull-up terminal. Since the voltage at intermediate node HB which is the ground reference for the voltage VB increases during this time period under the function of the inductor current until being clamped by the input voltage, the voltage VLX increases correspondingly. Since the voltage VB is greater than the second reference signal L_REF, the third control signal L_PR is at a low level, the second drive signal GL is at a low level, and the transistor Q2 starts to be turned off.

During a time period from t3 to t0', the first control signal PH is at a high level. In such case, the first drive signal GH is at a high level, and the transistor Q1 is on. The second control signal PL is at a low level. The switch S1 is on and the switch S2 is off. The voltage at the common terminal LX of the signal conversion circuit 3c and the second controller 242 is clamped by the voltage pull-up terminal, that is, the voltage value VLX at the common terminal LX (i.e. the intermediate signal L_PM) equals to the voltage VB at the voltage pull-up terminal. Since the voltage value VB is greater than the second reference signal L_REF, the third control signal L_PR is at a low level, the second drive signal GL is at a low level, and the transistor Q2 is kept off. From the moment t0', a next period of cycling starts.

According to technical solutions in the embodiment, the ground references of the first controller 241 and the second controller 242 are different due to the signal conversion circuit 3c. Thereby, the drive signals of the transistor Q1 and the transistor Q2 are isolated from each other, and the transistor Q1 and the transistor Q2 can be controlled to be switched between on and off alternatively. In addition, the ground reference of the first controller 241 is set to be the intermediate node HB of the bridge arm in the power converter 2, so as to facilitate sampling and acquiring the feedback signal that characterizes the resonant current. Thereby, the feedback control of the power converter is achieved.

Figure 5:
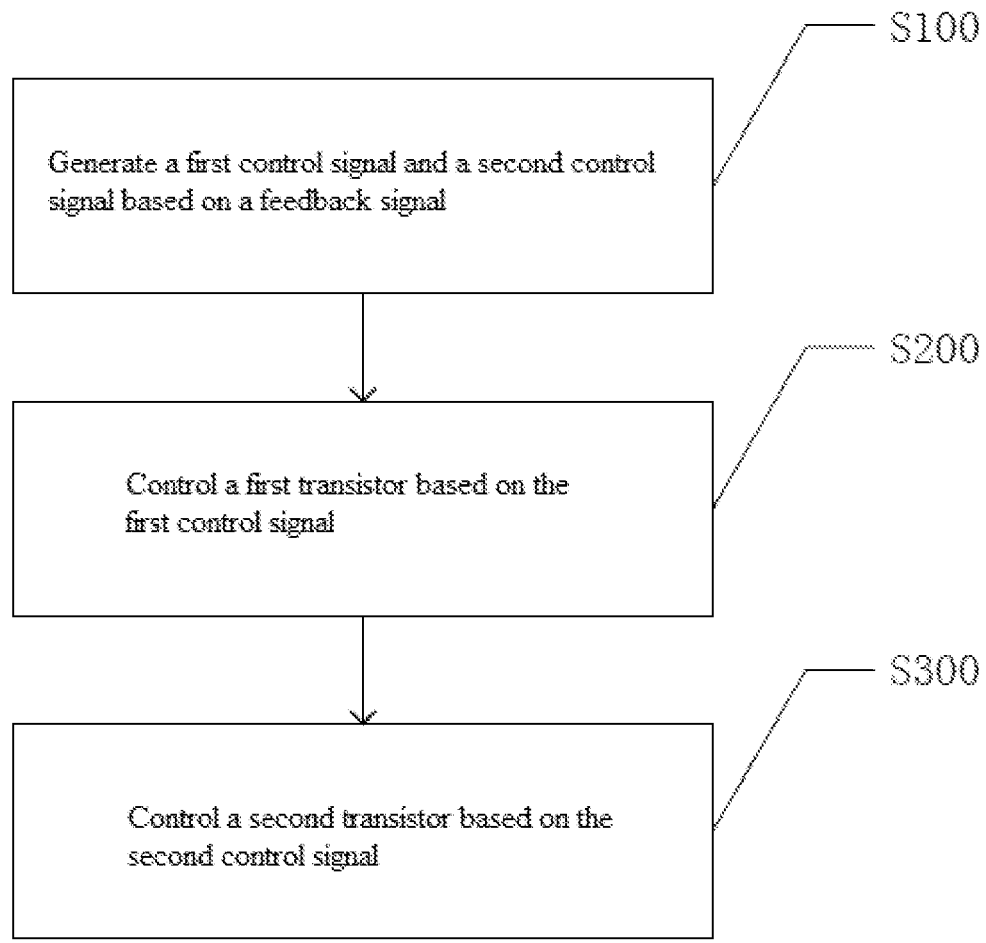
FIG. 5 is a flow chart of a control method according to an embodiment of the present disclosure.

FIG. 5 is a flow chart of a control method according to an embodiment of the present disclosure. As shown in FIG. 5, in step S100, a first control signal and a second control signal are generated based on a feedback signal. Preferably, the feedback signal is configured to characterize a resonant current of a power converter. Ground references of the first control signal and the second control signal are an intermediate node of a bridge arm of the power converter.

Specifically, an error signal is generated based on the feedback signal and a first reference signal by an error amplifier in a first controller. The first control signal and the second control signal are generated based on the error signal by a control-signal generation circuit. The first reference signal is configured to characterize an expected resonant current. The control-signal generation circuit may generate the first control signal and the second control signal by using a modulation method such as PWM or PFM.

In step S200, a first transistor is controlled based on the first control signal. Specifically, a first drive signal is generated based on the first control signal by a first drive circuit in the first controller, to control the first transistor to be switched between on and off.

In step S300, a second transistor is controlled based on the second control signal. Specifically, an intermediate signal is generated based on the second control signal by a signal conversion circuit. A third control signal is generated based on the intermediate signal by a second controller, and a second drive signal is generated based on the third control signal by the second controller, to control the second transistor to be switched between on and off. The intermediate signal is equal to a voltage at a voltage pull-up terminal in a case that the second control signal is not active. The ground reference of the first controller is also a ground reference of the voltage at the voltage pull-up terminal. The intermediate signal is equal to a voltage at the intermediate node of the bridge arm in a case that the second control signal is active. It should be appreciated that a sequence for performing the aforementioned steps is not limited.

According to technical solutions of the embodiment, the ground references of the first controller and the second controller are different (i.e. ground references of the drive signals of the first transistor and the second transistor are different), so as to isolate the drive signals of the first transistor and the second transistor from each other. Thereby, the first transistor and the second transistor are controlled to be switched between on and off alternatively, to achieve power conversion. In addition, the ground reference of the first controller is set to be the intermediate node HB of the bridge arm of the power converter, so as to facilitate sampling and acquiring the feedback signal that characterizes the resonant current. Thereby, feedback control of the power converter is achieved.

Described above are only preferable embodiments of the present disclosure, and the present disclosure are not limited thereto. Those skilled in the art can make various modifications and variations to the present disclosure. Any modification, equivalent replacement, modification, or the like that is made within the spirit and principle of the present disclosure should fall within the protection scope of the present disclosure.

The invention claimed is:

1. A control circuit for a power converter, wherein the power converter comprises a bridge arm, the bridge arm comprises a first transistor and a second transistor that are coupled in series, and the control circuit comprises:
    a first controller, configured to generate a first control signal and a second control signal based on a feedback signal, wherein the first control signal is configured to control the first transistor, and the first controller has a terminal coupled to an intermediate node of the bridge arm; and
    a second controller, configured to control the second transistor based on the second control signal, wherein a ground reference of the first controller is different from a ground reference of the second controller, and the intermediate node of the bridge arm serves as the ground reference of the first controller, and a grounding terminal of the second transistor serves as the ground reference of the second controller.

2. The control circuit according to claim 1, wherein the first controller comprises:
    an error amplifier, configured to generate an error signal based on the feedback signal and a first reference signal;
    a control-signal generation circuit, configured to generate the first control signal and the second control signal based on the error signal; and
    a first drive circuit, configured to generate a first drive signal based on the first control signal, to control the first transistor to be switched between on and off.

3. The control circuit according to claim 1, wherein the first controller comprises:
    a signal conversion circuit, configured to generate an intermediate signal based on the second control signal.

4. The control circuit according to claim 3, wherein the intermediate signal is controlled to be at different voltages in accordance with the second control signal.

5. The control circuit according to claim 3, wherein the intermediate signal is controlled to be switched between a reference voltage and a voltage of the ground reference of the first controller in accordance with a state of the second control signal.

6. The control circuit according to claim 3, wherein the signal conversion circuit is configured to:
    set the intermediate signal to be a voltage at a voltage pull-up terminal in a case that the second control signal is not active, and
    set the intermediate signal to be a voltage at an intermediate node of the bridge arm of the power converter in a case that the second control signal is active.

7. The control circuit according to claim 3, wherein the signal conversion circuit comprises:
    a phase inverter, configured to invert a phase of the second control signal;
    a first switch, wherein a first terminal of the first switch is coupled to a voltage pull-up terminal, and a control terminal of the first switch receives a phase-inverted second control signal;
    a second switch, wherein a first terminal of the second switch is coupled to an intermediate node of the bridge arm of the power converter, and a control terminal of the second switch receives the second control signal; and
    wherein a second terminal of the first switch and a second terminal of the second switch are coupled to a common terminal, and the common terminal serves as an output terminal of the signal conversion circuit and outputs the intermediate signal.

8. The control circuit according to claim 3, wherein the second controller comprises:
    a comparator, configured to generate a third control signal based on the intermediate signal and a second reference signal; and
    a second drive circuit, configured to generate a second drive signal based on the third control signal, to control the second transistor to be switched between on and off.

9. The control circuit according to claim 8, wherein the second reference signal is determined by voltage at a voltage pull-up terminal and a forward threshold voltage of a body diode of the second transistor.

10. The control circuit according to claim 1, wherein the feedback signal is configured to characterize a resonant current of the power converter.

11. A power converter, comprising:
    the control circuit according to claim 1;
    the bridge arm, comprising the first transistor and the second transistor that are coupled in series; and
    a resonant circuit, comprising an inductance element and a capacitance element.

12. The power converter according to claim 11, wherein the power converter comprises:
    a charge pump circuit, configured to perform power-factor-correction in conjunction with the resonant circuit.

13. A control method for a power converter, wherein the power converter comprises a bridge arm, the bridge arm comprises a first transistor and a second transistor that are connected in series, and the control method comprises:
    generating, by a first controller, a first control signal and a second control signal by comparing a feedback signal with a first reference signal;
    generating, by the first controller, a first drive signal based on the first control signal, to control the first transistor; and
    generating, by a second controller, a second drive signal based on the second control signal, to control the second transistor;
    wherein the first controller has a terminal connected to a inter mediate node of the bridge arm,
    wherein a ground reference of the first drive signal is different from a ground reference of the second drive signal, and
    wherein the intermediate node of the bridge arm serves as the ground reference of the first drive signal, and a grounding terminal of the second transistor serves as the ground reference of the second drive signal.

14. The control method according to claim 13, wherein generating, by the second controller, the second drive signal based on the second control signal to control the second transistor comprises:

generating, by the first controller, an intermediate signal based on the second control signal;

generating, by the second controller, a third control signal based on the intermediate signal; and generating, by the second controller, the second drive signal based on the third control signal, to control the second transistor.

15. The control method according to claim 14, wherein:

the intermediate signal is equal to a voltage at a voltage pull-up terminal in a case that the second control signal is not active, and the intermediate signal is equal to a voltage at the intermediate node of the bridge arm of the power converter in a case that the second control signal is active.

16. The control method according to claim 14, wherein generating, by the second controller, the third control signal based on the intermediate signal comprises:

comparing, by the second controller, the intermediate signal with a second reference signal to generate the third control signal, wherein the second reference signal is determined by voltage at a voltage pull-up terminal and a forward threshold voltage of a body diode of the second transistor.

* * * * *